United States Patent
Li et al.

(10) Patent No.: US 12,363,143 B2
(45) Date of Patent: Jul. 15, 2025

(54) METHOD AND APPARATUS FOR DETECTING SECURITY EVENT, AND COMPUTER-READABLE STORAGE MEDIUM

(71) Applicant: Hangzhou Dbappsecurity Co., Ltd., Zhejiang (CN)

(72) Inventors: Jiangchuan Li, Zhejiang (CN); Si Li, Zhejiang (CN); Haijun Jin, Zhejiang (CN); Lei Wang, Zhejiang (CN); Zhuoqun Wu, Zhejiang (CN)

(73) Assignee: HANGZHOU DBAPPSECURITY CO., LTD., Hangzhou Zhejiang (CN)

( * ) Notice: Subject to any disclaimer, the term of this patent is extended or adjusted under 35 U.S.C. 154(b) by 228 days.

(21) Appl. No.: 18/204,906

(22) Filed: Jun. 1, 2023

(65) Prior Publication Data
US 2023/0396633 A1    Dec. 7, 2023

(30) Foreign Application Priority Data
Jun. 6, 2022   (CN) .......................... 202210627278.6

(51) Int. Cl.
*H04L 9/40*   (2022.01)

(52) U.S. Cl.
CPC ...... *H04L 63/1416* (2013.01); *H04L 63/1425* (2013.01); *H04L 63/1441* (2013.01)

(58) Field of Classification Search
CPC ............. H04L 63/1416; H04L 63/1425; H04L 63/1441; G06F 16/9537; G06F 21/554; G06F 21/562
See application file for complete search history.

(56) References Cited

U.S. PATENT DOCUMENTS

| | | | |
|---|---|---|---|
| 10,397,258 B2 * | 8/2019 | Luo | H04L 63/1425 |
| 2006/0227714 A1 * | 10/2006 | Griffin | H04L 43/50 370/241 |
| 2018/0288074 A1 | 10/2018 | Thayer et al. | |
| 2019/0207969 A1 * | 7/2019 | Brown | H04L 63/1425 |

(Continued)

FOREIGN PATENT DOCUMENTS

| | | |
|---|---|---|
| CN | 111736579 A | 10/2020 |
| CN | 114143020 A | 3/2022 |
| WO | 2022083576 A1 | 4/2022 |

OTHER PUBLICATIONS

CEP Privacy Security Event Attribute Detection Tree and Access Control Framework, Jing Xin, Zhang Xiaotang, Guo Junjun, Zhang Shifang.

*Primary Examiner* — Richard G Keehn
(74) *Attorney, Agent, or Firm* — The Sun IP Law

(57) ABSTRACT

The present disclosure discloses a method and apparatus for detecting security event, and a non-transitory computer-readable storage medium, and relates to the field of big data. The method includes: acquiring a time window, and acquiring log data, wherein the time window is a rolling window in a preset period; matching the log data with a security event model in each time window, so as to generate a matching result set in each time window, wherein the security event model is a model comprising a plurality of rule models for identifying whether the log data has an attack behavior; and generating security event data according to the matching result set, so as to restore an attack process according to the security event data.

19 Claims, 3 Drawing Sheets

(56) References Cited

U.S. PATENT DOCUMENTS

| | | | |
|---|---|---|---|
| 2019/0342330 A1* | 11/2019 | Wu | H04L 63/1441 |
| 2020/0186569 A1 | 6/2020 | Milazzo et al. | |
| 2020/0334123 A1 | 10/2020 | Chatterjee et al. | |
| 2021/0406106 A1 | 12/2021 | Moss et al. | |
| 2022/0173994 A1* | 6/2022 | Ellam | G06F 11/3006 |
| 2022/0342990 A1* | 10/2022 | Zhang | G06F 21/562 |

* cited by examiner

METHOD AND APPARATUS FOR DETECTING SECURITY EVENT, AND COMPUTER-READABLE STORAGE MEDIUM

CROSS-REFERENCE TO RELATED DISCLOSURE

The present disclosure claims priority to Chinese Patent Disclosure No. 202210627278.6 filed to the China National Intellectual Property Administration on Jun. 6, 2022 and entitled "Method and Apparatus for Detecting Security Event, and a Computer-Readable Storage Medium", the disclosure of which is hereby incorporated by reference in its entirety.

TECHNICAL FIELD

The present disclosure relates to the field of big data, and in particular, to a method and apparatus for detecting security event, and a non-transitory computer-readable storage medium.

BACKGROUND

In general, a network security device or software reports monitored traffic data or attack data to a data monitoring platform, after a certain type of abnormal behavior is generated, if a security analyst wants to confirm whether the behavior has a potential security event, the security analyst often needs to manually retrieve and filter associated data from mass data, so that it is difficult to quickly and accurately judge and handle network attacks, and accordingly, the security of the network device may not be guaranteed in time; and after a certain type of attack is generated, the security analyst needs to retrieve the data to perform tracing judgment, resulting in the problem of difficult post-tracing after an attack event happens. Therefore, an effective method is urgently needed to improve the accuracy of attack detection, the degree of automation and the convenience of tracing. The existing association analysis method of network security event is to form an event queue by aggregating the same type of network security events, define an association relationship of the same attack scenario by using the relationship between nodes in tree rules in an association rule library, organize scattered data records into a complete attack scenario, match the record information in the event queue with the tree rules so as to form association rule mapping, and find the associated record information according to the mapping, so as to reconstruct an attack process.

Although the above solution solves the problem of finding a potential security event in mass data and performing accurate tracing, mining is performed on the basis of the mass data, such that a security event alarm needs to be generated after all data is processed, thereby lacking real-time performance.

In view of the above problems, a method for detecting security event is designed, which is an urgent problem to be solved by those skilled in the art.

SUMMARY

The embodiments of the present disclosure provide a method for detecting security event, including:
acquiring a time window, and acquiring log data, wherein the time window is a rolling window in a preset period;
matching the log data with a security event model in each time window, so as to generate a matching result set in each time window, wherein the security event model is a model including a plurality of rule models for identifying whether the log data has an attack behavior; and
generating security event data according to the matching result set, so as to restore an attack process according to the security event data.

In some embodiments of the present disclosure, the steps for generating the time window include:
setting a current system time to be a start time of the time window when a system is started, and setting, to be an end time of the time window, a time after the preset period starting from the start time;
according to a preset frequency, detecting whether a current time is greater than the end time of the time window; and
in response to that the current time is greater than the end time of the time window, setting the current time to be the start time of a new time window, and setting, to be the end time of the new time window, a time after the preset period starting from the start time of the new time window, so as to generate a rolling time window.

In some embodiments of the present disclosure, the step of matching the log data with the security event model in each time window includes:
acquiring a generation time of the log data;
judging whether the generation time of the log data is within a time range of the time window;
in response to that the generation time of the log data is within the time range of the time window, matching the log data with the security event model;
in response to that the generation time of the log data is less than the start time of the time window, deleting the log data;
in response to that the generation time of the log data is greater than the end time of the time window, storing the data of the matching result set, setting the end time of the time window to be the start time of the new time window, and setting, to be the end time of the new time window, a time after the preset period starting from the start time of the new time window; and
returning to the step of acquiring the generation time of the log data, so as to match the log data with the security event model in the new time window.

In some embodiments of the present disclosure, the matching result set includes a unique identifier of the log data and a unique identifier of the successfully matched rule model.

In some embodiments of the present disclosure, the step of matching the log data with the security event model in each time window includes:
acquiring a security event detection tree and a relational expression of the security event model, wherein the security event detection tree includes a root node, leaf nodes and non-leaf nodes; and
matching the log data according to the security event detection tree and the relational expression, wherein
the root node represents a state result for indicating whether the security event model is successfully matched; the leaf nodes store information of the rule models; the non-leaf nodes represent state results corresponding to whether the leaf nodes are successfully matched; and the relational expression represents a relationship between the rule models.

In some embodiments of the present disclosure, the step of matching the log data according to the security event detection tree includes:

acquiring the state result of the root node;
according to the state result of the root node, judging whether the security event model is successfully matched;
in response to that it is judged according to the state result of the root node that the security event model is not successfully matched, acquiring the non-leaf node that is not successfully matched under the root node;
generating the state result of the root node according to the state result of the non-leaf node and the relational expression;
according to the state result of the root node, judging whether the security event model is successfully matched;
in response to that the security event model is not successfully matched, acquiring the leaf node corresponding to the non-leaf node;
generating the state result of the non-leaf node according to the leaf node and the relational expression;
returning to the step of acquiring the non-leaf node that is not successfully matched under the root node; and
in response to that the security event model is successfully matched, updating the state result of the root node, and updating the matching result set.

In some embodiments of the present disclosure, the step of acquiring the log data includes:

collecting the log data; and
performing normalization processing on a name of a data field of the log data by means of the ETL technology, standardizing a data value, supplementing a feature field, and adding the unique identifier of the log data, so as to generate standardized log data.

The embodiments of the present disclosure further provide an apparatus for detecting security event, including:

an acquisition component, configured to acquire a time window and acquire log data, wherein the time window is a rolling window in a preset period;
a matching component, configured to match the log data with a security event model in each time window, so as to generate a matching result set in each time window, wherein the security event model is a model including a plurality of rule models for identifying whether the log data has an attack behavior; and
a generation component, configured to generate security event data according to the matching result set, so as to restore an attack process according to the security event data.

The embodiments of the present disclosure further provide another apparatus for detecting security event, including:

a memory, configured to store a computer program; and
a processor, configured to perform the computer program to implement the steps of the method for detecting security event described above.

The embodiments of the present disclosure further provide a non-transitory computer-readable storage medium, wherein a computer program is stored on the non-transitory computer-readable storage medium, and the computer program implements, when executed by a processor, the steps of the method for detecting security event described above.

In addition, the embodiments of the present disclosure further provide an apparatus for detecting security event and a non-transitory computer-readable storage medium.

BRIEF DESCRIPTION OF THE DRAWINGS

To illustrate the embodiments of the present disclosure more clearly, a brief introduction on the drawings which are needed in the following embodiments of the present disclosure is given below. Apparently, the drawings in the description below are merely some of the embodiments of the present disclosure, based on which other drawings may be obtained by those ordinary skilled in the art without any creative effort.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

The core of the present disclosure is to provide a method and apparatus for detecting security event, and a non-transitory computer-readable storage medium.

In order to enable those skilled in the art to better understand the solutions of the present disclosure, the embodiments of the present disclosure is further described in detail below in combination with the drawings and embodiments.

Figure 1:
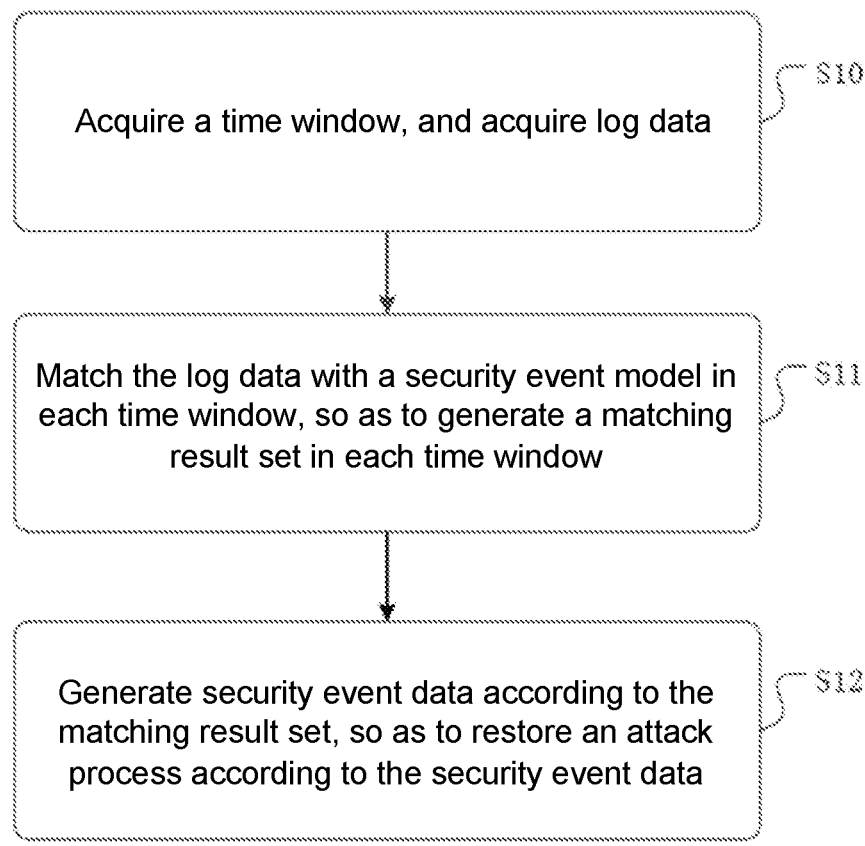
FIG. 1 is a flowchart of a method for detecting security event provided in the embodiments of the present disclosure.

A network security device or software reports monitored traffic data or attack data to a data monitoring platform, after a certain type of abnormal behavior is generated, in response to that a security analyst wants to confirm whether the behavior has a potential security event, the security analyst often needs to manually retrieve and filter associated data from mass data, so that it is difficult to quickly and accurately judge and handle network attacks, and accordingly, the security of the network device may not be guaranteed in time; and after a certain type of attack is generated, the security analyst needs to retrieve the data to perform tracing judgment, resulting in the problem of difficult post-tracing after an attack event happens. Although the existing solution solves the problem of finding a potential security event in mass data and performing accurate tracing, mining is performed on the basis of the mass data, such that a security event alarm needs to be generated after all data is processed, thereby lacking real-time performance. Therefore, the present disclosure provides a method for detecting security event, which may improve the real-time performance of the security event alarm. FIG. 1 is a flowchart of a method for detecting security event provided in the embodiments of the present disclosure. As shown in FIG. 1, the method includes:

S10: acquiring a time window, and acquiring log data, wherein the time window is a rolling window in a preset period.

S11: matching the log data with a security event model in each time window, so as to generate a matching result set in each time window, wherein the security event model is a model including a plurality of rule models for identifying whether the log data has an attack behavior.

S12: generating security event data according to the matching result set, so as to restore an attack process according to the security event data.

Figure 2:
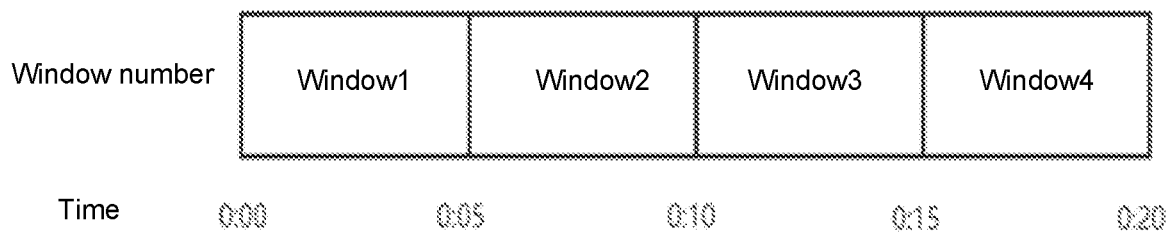
FIG. 2 is a schematic diagram of a rolling window provided in the embodiments of the present disclosure.

In the embodiments of the present disclosure, in order to detect a security event of the network security device or software, log data and the time window of the network security device or software are firstly acquired. The time window is a rolling window in a preset period. It may be understood that the function of the time window in the embodiments of the present embodiment is to perform window calculation in a subsequent matching process; and the window calculation is a data processing mode in real-time calculation, a data stream segmented into different windows according to a fixed time or length, and then a corresponding aggregation operation is performed on the data, so as to obtain a statistical result within a certain time range. A Flink calculation framework (Flink is an open-source stream processing framework developed by the Apache software foundation, and is widely used to solve the problems of real-time calculation and offline calculation in the field of big data) may implement this function. The window is subdivided into a rolling window and a sliding window, and it may be understood that the time window in the embodiment of the present disclosure is a rolling window. FIG. 2 is a schematic diagram of a rolling window provided in the embodiments of the present disclosure. As shown in FIG. 2, the rolling window is to allocate each element to a window of a specified size; and typically, the rolling window has a fixed size and does not overlap. For example, in response to that a rolling window with a size of 5 minutes is specified, the data of an infinite stream is divided into windows of [0:00, 0:05), [0:05, 0:10), [0:10, 0:15) and the like according to time. In the embodiment of the present disclosure, the preset period is not limited, and each security event model may autonomously set the size of the rolling window according to an attack scenario corresponding to the security event model itself, which may be determined according to implementation conditions. Meanwhile, the generation process of the time window is not limited, and is determined according to implementation conditions.

Further, after the log data and the time window are obtained, the log data is matched with the security event model in each time window, so as to generate the matching result set in each time window. In the embodiment of the present disclosure, this step is jointly completed by a matching analysis algorithm component and a matching result set component, wherein the matching analysis algorithm component may match the log data with the security event model, establish an association relationship between the log data and the security event model, and record the association relationship in the matching result set. The matching result set component may dynamically record a state of whether rules in the security event model are successfully matched in a window calculation period, and map a unique identifier of the log data that is successfully matched with the rules and unique identifiers of the rule models; and each security event model corresponds to one matching result set.

In some embodiments of the present disclosure, the matching analysis algorithm component and the matching result set component run in the form of a rolling time window on the basis of the real-time calculation of Flink; the preset period of one time window is known, and the matching analysis algorithm performs a matching operation on the log data and the security event model by using the preset period as a minimum unit, so as to generate the matching result set. No matter whether the security event model is successfully matched in the preset period, the security event data is generated according to the matching result set, that is, a unique data identifier in the matching result set, the unique identifier corresponding to the successfully matched rule and the information of the security event model are integrated to form the security event data; and in response to that the model is successfully matched, the security event data is integrated into a security event to be written into a database, and otherwise, the calculation result of the period is discarded. The real-time performance of the security event is effectively improved by means of performing calculation using the above time window to shorten the calculation period. In the embodiments of the present disclosure, the process and method for matching the log data with the security event model in each time window are not limited, and are determined according to implementation conditions.

It should be noted that, the security event model is a model including a plurality of rule models for identifying whether the log data has an attack behavior, wherein the rule model is a model capable of directly identifying whether the log data or traffic data includes an attack behavior, and includes a regular expression or other java executable logic expressions for judging whether the log data includes a certain attack feature, so as to achieve the function of identifying the attack behavior; and correspondingly, each rule model further includes the following information: corresponding attack description information, attack behavior features, attack technology and tactical information for describing the rule model. Moreover, for different attack behaviors, the security event model further includes other corresponding rule models, and the rule models are jointly stored in a rule model library. The rule models are assembled to generate the security event model, each rule model may be reused, and all rule models may be freely combined according to actual scenario requirements, so as to generate the security event model.

The security event model is a model including a plurality of rule models, wherein the relationship between each rule model may be a relationship of "and (and)", "or (or)" and "non-(!)". For example, in response to that the rule models in the security event model are respectively rule_1, rule_2, rule_3, rule_4, rule_5 and rule_6, the relationship therebetween may be: (rule_1 and rule_2) and (rule_3 or rule_4) and (rule_5 and rule_6). It should be noted that the number of nested layers of the rule models is used for describing the hierarchy of the security event model, and the dimension of the security event model is described with the number of times of operation of an outermost logical expression, so that the above expression indicates that the security event model is a 3-dimensional 2-layer security event model.

After the security event data is obtained, in order to restore the attack process according to the security event data, in a implementation, the security event data is written into the database; and a service end tracing display layer extracts necessary information such as attack features and attack description from the rule model database according to the security event data, so as to restore the attack process, thereby realizing the detection of the security event, so as to give an alarm to the security event.

In the embodiments of the present disclosure, the method includes: acquiring the time window, and acquiring the log data, wherein the time window is the rolling window in the preset period; matching the log data with the security event model in each time window, so as to generate the matching result set in each time window, wherein the security event model is the model including the plurality of rule models for identifying whether the log data has the attack behavior; and generating the security event data according to the matching result set, so as to restore the attack process according to the security event data. Therefore, by means of the above solution, the matching result of the log data in each time window may be respectively acquired by means of matching the log data with the security event model in the rolling time window, thereby shortening the matching calculation period and effectively improving the real-time performance of security event detection.

On the basis of the above embodiment:

As the embodiments of the present disclosure, the steps for generating the time window include:

setting a current system time to be a start time of the time window when a system is started, and setting, to be an end time of the time window, a time after the preset period starting from the start time;

according to a preset frequency, detecting whether a current time is greater than the end time of the time window; and in response to that the current time is greater than the end time of the time window, setting the current time to be the start time of a new time window, and setting, to be the end time of the new time window, a time after the preset period starting from the start time of the new time window, so as to generate a rolling time window.

In the above embodiments of the present disclosure, the generation process of the time window is not limited, and is determined according to implementation conditions. As the embodiments of the present disclosure, in the present embodiment, the generation of the time window starts when the system is started. In some embodiments of the present disclosure, a timer is provided in the system, after the system is started, the current system time is immediately set to be the start time of the time window, and the end time of the time window is the start time plus the preset period. For example, in response to that the preset period is 5 minutes, then the end time of the time window is the start time plus 5 minutes.

The timer detects, at the preset frequency, whether the current time has been greater than the end time of the time window. In response to that the current time is greater than the end time of the time window, the current time is set to be the start time of the new time window, and the end time of the new time window is the start time of the new time window plus the preset period, thereby generating the rolling time window.

In the embodiments of the present disclosure, by means of setting the current system time to be the start time of the time window when the system is started, and setting, to be the end time of the time window, the time after the preset period starting from the start time; according to the preset frequency, detecting whether the current time is greater than the end time of the time window; and in response to that the current time is greater than the end time of the time window, setting the current time to be the start time of the new time window, and setting, to be the end time of the new time window, the time after the preset period starting from the start time of the new time window, so as to generate the rolling time window, the matching between the log data and the security event mode is performed in the time window.

On the basis of the above embodiment of the present disclosure:

As the embodiments of the present disclosure, the step of matching the log data with the security event model in each time window includes:

acquiring a generation time of the log data;

judging whether the generation time of the log data is within a time range of the time window;

in response to that the generation time of the log data is within the time range of the time window, matching the log data with the security event model;

in response to that the generation time of the log data is less than the start time of the time window, deleting the log data;

in response to that the generation time of the log data is greater than the end time of the time window, storing the data of the matching result set, setting the end time of the time window to be the start time of the new time window, and setting, to be the end time of the new time window, a time after the preset period starting from the start time of the new time window; and returning to the step of acquiring the generation time of the log data, so as to match the log data with the security event model in the new time window.

In the above embodiments of the present disclosure, the process of matching the log data with the security event model in each time window is not limited, and is determined according to implementation conditions. As the embodiments of the present disclosure, when the log data is matched with the security event model, the generation time of the log data is acquired at first, and the generation time of the log data is the time of the log data. The log data flows in, in response to that the time of the log data is within the time range of the time window, the log data is matched with the security event model, and the matching result is stored in the matching result set; in response to that the time of the log data is less than the start time of the time window, this piece of data has lost timeliness or is dirty data, and thus is deleted; in response to that the time of the log data is greater than the end time of the time window, it indicates that the present window ends, and the result set is stored after being arranged; and the end time of the present time window is set to be the start time of the next time window, and the end time of the new time window is the start time of the new time window plus the preset period.

It should be noted that, since the log data is not necessarily continuous all the time in the matching process, when the data stream is discontinuous, it is impossible to use the time of the log data to accurately judge whether the current window has ended, so that the timer needs to perform a window switching operation. In response to that it is judged that the window switching operation needs to be performed, the timer first checks whether there is an unsaved matching result in the matching result set; and in response to that there is an unsaved matching result in the matching result set, stores the data in the matching result set, and then executes the window switching operation.

In the embodiments of the present disclosure, by means of acquiring the generation time of the log data; judging whether the generation time of the log data is within the time range of the time window; in response to that the generation time of the log data is within the time range of the time window, matching the log data with the security event model; in response to that the generation time of the log data is less than the start time of the time window, deleting the log data; in response to that the generation time of the log data is greater than the end time of the time window, storing the data of the matching result set, setting the end time of the time window to be the start time of the new time window, and setting, to be the end time of the new time window, the time after the preset period starting from the start time of the new time window; and returning to the step of acquiring the generation time of the log data, so as to match the log data with the security event model in the new time window, the matching between the log data and the security event model in each time window is realized at last.

On the basis of the above embodiments of the present disclosure:

As the embodiments of the present disclosure, the matching result set includes a unique identifier of the log data and a unique identifier of the successfully matched rule model.

As the embodiments of the present disclosure, the matching result set in the embodiments of the present disclosure utilizes a bitmap structure. Bitmap is a data structure, and the basic idea of which is to mark a value corresponding to an element index by using one bit. The bit is used as a unit to store data, so that the storage space may be greatly saved. Therefore, the content included in the bitmap-based matching result set is the unique identifier of the log data and the unique identifier of the successfully matched rule model.

Figure 3:
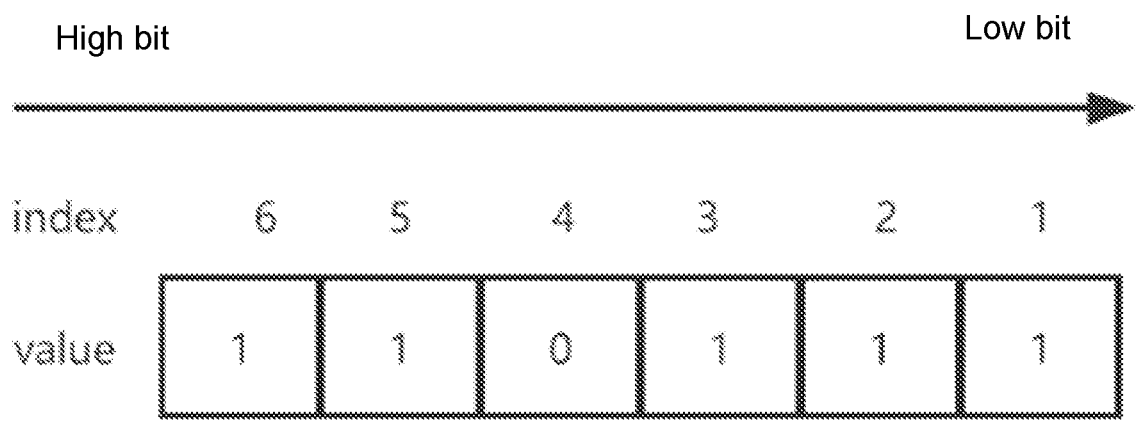
FIG. 3 is a schematic diagram of a matching result set provided in the embodiments of the present disclosure.

FIG. 3 is a schematic diagram of a matching result set provided in the embodiments of the present disclosure. As shown in FIG. 3, six rule models are included in the security event model corresponding to the matching result set. The sequence number of the bit from low to high is an index value, for example, the value corresponding to the index value 4 is 0, which indicates that the rule model numbered 4 in the security event model is successfully matched; and the remaining values are 1, which indicates that the rule models are not successfully matched yet. The core bitmap designed in the matching result set is expressed as a decimal integer in the actual representation by using a long integer, and the state of the corresponding bit is modified in a bitwise manner during an operation process.

It should be noted that, the security event model in the embodiments of the present disclosure should be completed by jointly matching different log data, and the security event data is output at last (that is, the security event data should consist of several pieces of log data, and thus is a log data set). Therefore, model matching calculation is performed on the data in each window calculation period, the matching result set is dynamically changed, and when the window ends, a matching result is output. When one security event model is composed of six rules, the initial value of the bitmap is 63, and the corresponding binary is: 00111111; in response to that the rule_5 is successfully matched during the matching process, then the value of the bitmap becomes 47, and the corresponding binary is: 00101111; and so on, when the value of the bitmap is 0, and the binary is expressed as 00000000, it indicates that all rules are successfully matched.

In addition, the matching result set further includes a mapping relationship between a unique identifier of successfully matched standard data and a rule id, and a unique identifier of the security event model.

In the embodiments of the present disclosure, the matching result set uses the bitmap structure, and includes the unique identifier of the successfully matched rule model; and the mapping relationship for mapping the unique identifier of the mapping log data and the unique identifier of the successfully matched rule model is established, thereby realizing the storage of the rule model matching result in the security event model.

On the basis of the above embodiments of the present disclosure:

As the embodiments of the present disclosure, the step of matching the log data with the security event model in each time window includes:
  acquiring a security event detection tree and a relational expression of the security event model, wherein the security event detection tree includes a root node, leaf nodes and non-leaf nodes; and
  matching the log data according to the security event detection tree and the relational expression, wherein
    the root node represents a state result for indicating whether the security event model is successfully matched; the leaf nodes store information of the rule models; the non-leaf nodes represent state results corresponding to whether the leaf nodes are successfully matched; and the relational expression represents a relationship between the rule models.

In the above embodiments of the present disclosure, the method for matching the log data with the security event model in each time window is not limited, and is determined according to implementation conditions. As the embodiments of the present disclosure, the matching between the log data and the security event model is implemented by a security event detection tree of a B+ tree structure. The B+ tree is a tree data structure, and is typically used in a file system of a database and an operating system. The B+ tree has the features of being able to keep the data stable and ordered, and the insertion and modification of the B+ tree have relatively stable logarithmic time complexity. The data of the B+ tree is stored in the leaf node, and only keywords (minimum values of the leaf nodes are used as indexes) and child pointers are stored in the B+ tree, so that internal nodes are simplified; and the B+ tree connects the leaf nodes in series to form a linked list, so that efficient traversal may be performed.

In some embodiments of the present disclosure, the security event model is a security event detection tree. The security event detection tree includes the root node which represents the state result for indicating whether the security event model is successfully matched, the leaf nodes for storing information of the rule models, and the non-leaf nodes which represent state results corresponding to whether the leaf nodes are successfully matched. The number of the leaf nodes of the security event detection tree corresponds to the number of 1 (from low bit to high bit) in the binary expression of the bitmap, for example, the number of the leaf nodes of the security event detection tree is 6, and the corresponding binary expression is 00111111, then the initial value of the bitmap is 63.

In addition, the relational expression for representing the relationship between the rule models also needs to be acquired before matching. For example, in a security event model including six rule models, (rule_1 and rule_2) and (rule_3 or rule_4) and (rule_5 and rule_6) is a relational expression.

Finally, the log data is matched by means of the security event detection tree and the relational expression, so as to obtain the matching result set. In the embodiments of the present disclosure, the process of matching the log data by means of the security event detection tree and the relational expression is not limited, and is determined according to implementation conditions.

In the embodiments of the present disclosure, by means of acquiring the security event detection tree and the relational expression of the security event model, wherein the security event detection tree includes the root node, the leaf nodes and the non-leaf nodes; and matching the log data according to the security event detection tree and the relational expression, the matching between the security event model and the log data is realized.

On the basis of the above embodiments of the present disclosure:

As the embodiments of the present disclosure, the step of matching the log data according to the security event detection tree includes:

acquiring the state result of the root node;

according to the state result of the root node, judging whether the security event model is successfully matched;

in response to that it is judged according to the state result of the root node that the security event model is not successfully matched, acquiring the non-leaf node that is not successfully matched under the root node;

generating the state result of the root node according to the state result of the non-leaf node and the relational expression;

according to the state result of the root node, judging whether the security event model is successfully matched;

in response to that the security event model is not successfully matched, acquiring the leaf node corresponding to the non-leaf node;

generating the state result of the non-leaf node according to the leaf node and the relational expression;

returning to the step of acquiring the non-leaf node that is not successfully matched under the root node; and in response to that the security event model is successfully matched, updating the state result of the root node, and updating the matching result set.

Figure 4:
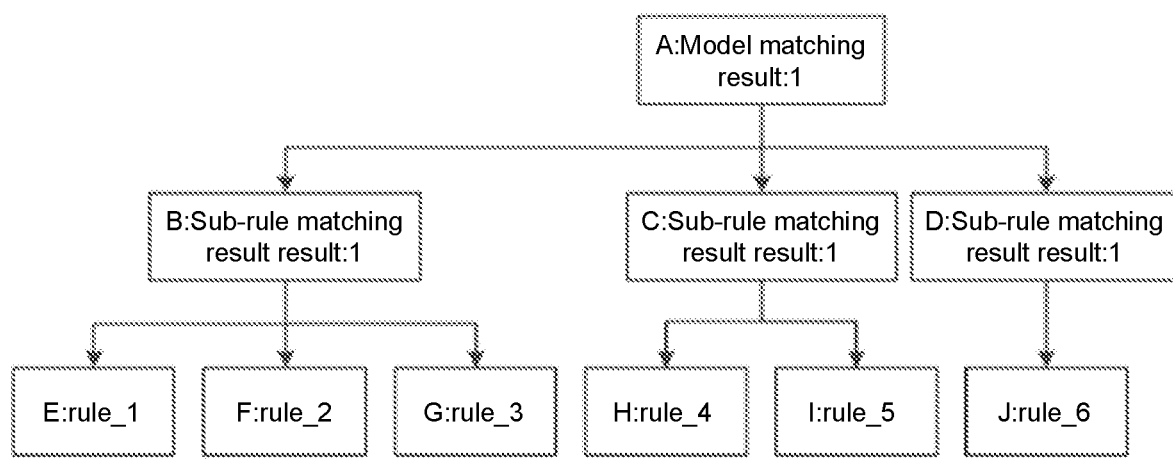
FIG. 4 is a schematic diagram of a security event detection tree provided in the embodiments of the present disclosure.

FIG. 4 is a schematic diagram of a security event detection tree provided in the embodiments of the present disclosure. As shown in FIG. 4, a root node A stores a final result of matching the security event model; non-leaf nodes B, C and D store rule matching results of leaf nodes thereof; and leaf nodes E, F, G, H, I and J respectively store the information of the unique identifiers of the rule models of rule_1 to rule_6. Taking FIG. 4 as an example, the process of matching the log data according to the security event detection tree is as follows:

first, traversing the state result of the root node A of the security event detection tree; according to the state result of the root node, judging whether the security event model is successfully matched; in response to that the matching result is 0, it indicates that the matching is successful, then not traversing the security event detection tree; and in response to that the matching result is 1, it indicates that the matching is not successful, then traversing the security event detection tree. In some embodiments of the present disclosure, before traversing the state result of the root node of the security event detection tree, the value of the bitmap in the matching result set may be judged first, in response to that the result is 0, it indicates that the model has been successfully matched, and then the traversal is exited; and in response to that the result is not 0, it indicates that the security event model is still not successfully matched, and then the security event detection tree is traversed; and further, when the state result of the root node A is 1, that is, the matching is not successful, traversing the security event detection tree, so as to acquire the non-leaf node that is not successfully matched under the root node, that is, searching for a node of which the state value is 1 among the non-leaf nodes B, C and D, so as to perform continued downward traversal, calculating the acquired state result of the node according to the relational expression, so as to generate the state result of the root node, and storing the calculation result in the node A, so as to conveniently determine, according to the state result of the root node, whether the security event model is successfully matched. Taking the relationship expression (rule_1 and rule_2 or rule_3) and (rule_4 and rule_5) and rule_6 as an example, when the state results of the non-leaf nodes B, C and D are all 0, the state result of the root node is 0, that is, the matching is successful, the matching result set is updated and the traversal is exited, otherwise, the matching is not successful, and downward traversal is continued.

At this time, in response to that it is judged according to the state result of the root node that the security event model is not successfully matched, the non-leaf node B is 1, the leaf nodes E, F and G under the non-leaf node B continue to be traversed, the state result of the non-leaf node B is generated according to the leaf nodes and the relational expression, and is stored in the non-leaf node B. Taking the above relationship expression as an example, since the relationship between the leaf nodes E, F and G under the non-leaf node B is rule_1 and rule_2 or rule_3, when the leaf node E is successfully matched and at least one of the leaf node E or G is successfully matched, the state result of the non-leaf node B is 0, and is 1 in other conditions.

Returning to the step of acquiring the non-leaf node that is not successfully matched under the root node, and the above step is repeated to complete the traversal of the leaf nodes under the non-leaf nodes C and D. After each sub-tree is traversed during the process, the state value of the root node A is calculated, and in response to that the state value becomes 0, the traversal is exited; and otherwise, the next sub-tree of which the state value is 1 continues to be searched for traversal, until it is judged according to the state result of the root node that the security event model is successfully matched, the state result of the root node is updated, a unique data identifier is recorded, and the matching result set is updated.

In the embodiments of the present disclosure, by means of acquiring the state result of the root node; according to the state result of the root node, judging whether the security event model is successfully matched; in response to that it is judged according to the state result of the root node that the security event model is not successfully matched, acquiring the non-leaf node that is not successfully matched under the root node; generating the state result of the root node according to the state result of the non-leaf node and the relational expression; according to the state result of the root node, judging whether the security event model is successfully matched; in response to that the security event model is not successfully matched, acquiring the leaf node corresponding to the non-leaf node; generating the state result of the non-leaf node according to the leaf node and the relational expression; returning to the step of acquiring the non-leaf node that is not successfully matched under the root node; and in response to that the security event model is successfully matched, updating the state result of the root node, and updating the matching result set, the matching process of the log data on the basis of the security event detection tree is realized.

On the basis of the above embodiments of the present disclosure:

As the embodiments of the present disclosure, the step of acquiring the log data includes:

collecting the log data; and performing normalization processing on a name of a data field of the log data by means of the ETL technology, standardizing a data value, supplementing a feature field, and adding the unique identifier of the log data, so as to generate standardized log data.

It may be understood that, the data warehouse technology (Extract Transform Load, ETL) is used for describing the process of data from a source end to a destination end by means of extract (extract), transform (transform) and load (load). The source end may be software such as a database and message middleware, and the destination end may be a storage medium such as a database and a file system. During the process of acquiring the log data, the log data is collected at first, but the source of the log data and the attribute of the data may be different. In order to ensure the accuracy of subsequent matching, in the embodiments of the present disclosure, normalization processing is performed on the name of the data field of the log data by means of the ETL technology, the data value is standardized, the feature field is supplemented, and the unique identifier of the log data is added, so as to generate the standardized log data. That is, data standardization cleaning is performed on attack data which is reported to a data platform by different data sources, and a unique identifier field of the log data is added to form the standardized standard data, so as to facilitate subsequent unified processing.

In the embodiments of the present disclosure, by means of collecting the log data, and performing the normalization processing on the name of the data field of the log data by means of the ETL technology, standardizing the data value, supplementing the feature field, and adding the unique identifier of the log data, so as to generate the standardized log data, standardized processing of the log data is realized, and subsequent matching with the security event model is facilitated.

In the above embodiments of the present disclosure, the method for detecting security event is described in detail, and the embodiments of the present disclosure further provides an embodiment corresponding to an apparatus for detecting security event. It should be noted that, the embodiments of the present disclosure describes the embodiment of the apparatus from two angles, one is an angle based on functional components, and the other is an angle based on a hardware structure.

Figure 5:
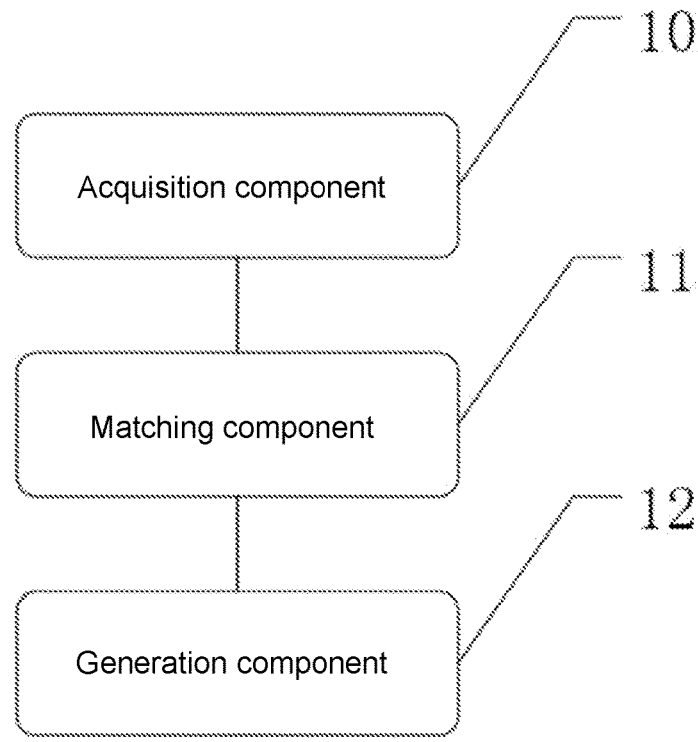
FIG. 5 is a schematic structural diagram of an apparatus for detecting security event provided in the embodiments of the present disclosure.

FIG. 5 is a schematic structural diagram of an apparatus for detecting security event provided in the embodiments of the present disclosure. As shown in FIG. 5, the apparatus for detecting security event includes:

an acquisition component 10, configured to acquire a time window and acquire log data, wherein the time window is a rolling window in a preset period;

a matching component 11, configured to match the log data with a security event model in each time window, so as to generate a matching result set in each time window, wherein the security event model is a model including a plurality of rule models for identifying whether the log data has an attack behavior; and a generation component 12, configured to generate security event data according to the matching result set, so as to restore an attack process according to the security event data.

Since the embodiment of the apparatus corresponds to the embodiment of the method, for the embodiment of the apparatus, reference may be made to the description in the embodiment of the method, and thus details are not described herein again.

Figure 6:
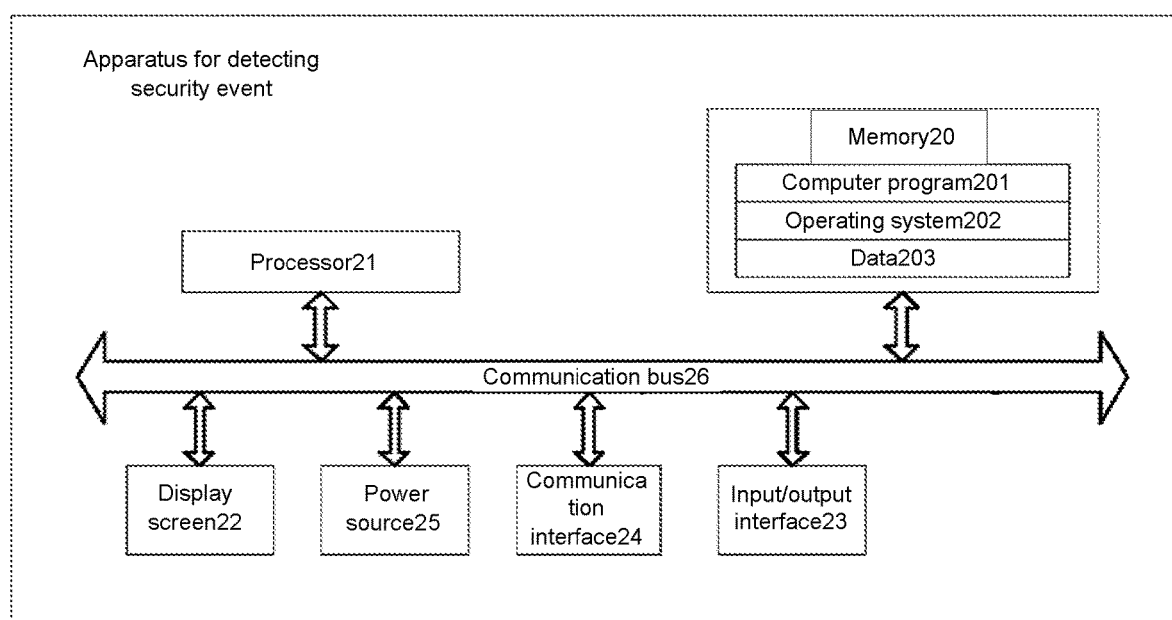
FIG. 6 is a schematic structural diagram of another apparatus for detecting security event provided in the embodiments of the present disclosure.

FIG. 6 is a schematic structural diagram of another apparatus for detecting security event provided in the embodiments of the present disclosure. As shown in FIG. 6, the apparatus for detecting security event includes:

a memory 20, configured to store a computer program; and a processor 21, configured to perform the computer program to implement the steps of the method for detecting security event mentioned in the above embodiment.

The apparatus for detecting security event provided in the embodiments of the present disclosure may include, but is not limited to, a smart phone, a tablet computer, a notebook computer, or a desktop computer, etc.

The processor 21 may include one or more processing cores, such as a 4-core processor, 8-core processor, or the like. The processor 21 may be implemented in at least one hardware form of a digital signal processor (Digital Signal Processor, DSP), a field-programmable gate array (Field-Programmable Gate Array, FPGA), and a programmable logic array (Programmable Logic Array, PLA). The processor 21 may also include a main processor and a co-processor, wherein the main processor is a processor for processing data in a wake-up state, and is also referred to as a central processing unit (Central Processing Unit, CPU); and the co-processor is a low-power-consumption processor for processing data in a standby state. In some embodiments of the present disclosure, the processor 21 may be integrated with a graphics processing unit (Graphics Processing Unit, GPU), wherein the GPU is used for rendering and drawing content that needs to be displayed on a display screen. In some embodiments of the present disclosure, the processor 21 may further include an artificial intelligence (Artificial Intelligence, AI) processor, wherein the AI processor is used for processing calculation operations related to machine learning.

The memory 20 may include one or more non-transitory computer-readable storage medium, wherein the non-transitory computer-readable storage medium may be non-transitory. The memory 20 may further include a high-speed random access memory, and a non-volatile memory, such as one or more magnetic disk storage devices and a flash memory storage device. In the embodiments of the present disclosure, the memory 20 is at least used for storing the following computer program 201, wherein after being loaded and executed by the processor 21, the computer program may implement related steps of the method for detecting security event disclosed in any one of the foregoing embodiments. In addition, resources stored in the memory 20 may further include an operating system 202, data 203, and the like, and the storage mode may be temporary storage or permanent storage. The operating system 202 may include Windows, Unix, Linux, etc. The data 203 may include, but is not limited to, data involved in the method for detecting security event.

In some embodiments of the present disclosure, the apparatus for detecting security event may further include a display screen 22, an input/output interface 23, a communication interface 24, a power source 25, and a communication bus 26.

Those skilled in the art may understand that, the structure shown in FIG. 6 does not constitute a limitation on the apparatus for detecting security event, and the apparatus for detecting security event may include more or fewer components than those shown in the figure.

Finally, the embodiments of the present disclosure further provide an embodiment corresponding to a non-transitory computer-readable storage medium. A computer program is stored on the non-transitory computer-readable storage medium, and the computer program implements, when executed by a processor, the steps described in the foregoing method embodiments.

It may be understood that, in response to that the method in the above embodiments is implemented in the form of a software functional unit and is sold or used as an independent product, it may be stored in a non-transitory computer-readable storage medium. Based on this understanding, the technical solutions of the embodiments of the present disclosure substantially, or the part contributing to the prior art, or part of or all the technical solutions may be implemented in the form of a software product, the computer software product is stored in a storage medium for executing all or part of steps of the method in various embodiments of the present disclosure. The foregoing storage medium includes a variety of media capable of storing program codes, such as a USB disk, a mobile hard disk, a read-only memory (Read-Only Memory, ROM), a random access memory (Random Access Memory, RAM), a magnetic disk, or an optical disk.

The method and apparatus for detecting security event, and the non-transitory computer-readable storage medium provided in the embodiments of the present disclosure are described in detail above. Various embodiments in the specification are described in a progressive manner, each embodiment focuses on the difference from other embodiments, and the same or similar parts between the various embodiments refer to each other. The apparatus disclosed in the embodiments of the present disclosure corresponds to the method disclosed in the embodiments of the present disclosure, and thus is described relatively simple, and the relevant parts refer to the description of the method. It should be noted that, for those ordinary skilled in the art, several improvements and modifications may also be made to the embodiments of the present disclosure without departing from the principles of the embodiments of the present disclosure, and these improvements and modifications also fall within the protection scope of the claims of the embodiments of the present disclosure.

It should also be noted that, in the present specification, relational terms such as first, second and the like are merely used to distinguish one entity or operation from another entity or operation, and do not necessarily require or imply that there is any such actual relationship or sequence between these entities or operations. Moreover, the terms "include", "contain" or any other variants thereof are intended to cover non-exclusive inclusions, such that a process, a method, an article or a device including a series of elements not only includes those elements, but also includes other elements that are not explicitly listed, or also includes elements inherent to such process, method, article or device. In response to that there are no more restrictions, the element defined by the statement "including a . . . " does not exclude the existence of other identical elements in the process, the method, the article or the device which includes the element.

What is claimed is:

1. A method for detecting security event, comprising:
    acquiring a time window, and acquiring log data, wherein the time window is a rolling window in a preset period;
    matching the log data with a security event model in each time window, so as to generate a matching result set in each time window, wherein the security event model is a model comprising a plurality of rule models for identifying whether the log data has an attack behavior; and
    generating security event data according to the matching result set, so as to restore an attack process according to the security event data, wherein restoring the attack process is used to realize detection of the security event, in order to give an alarm for the security event;
    wherein acquiring the log data comprises: collecting the log data; and performing normalization processing on a name of a data field of the log data by means of Extract Transform Load (ETL) technology, standardizing a data value, supplementing a feature field, and adding a unique identifier of the log data, so as to generate standardized log data.

2. The method for detecting security event as claimed in claim 1, wherein steps for generating the time window comprise:
    setting a current system time to be a start time of the time window when a system is started, and setting, to be an end time of the time window, a time after the preset period starting from the start time;
    according to a preset frequency, detecting whether a current time is greater than the end time of the time window; and
    in response to that the current time is greater than the end time of the time window, setting the current time to be the start time of a new time window, and setting, to be the end time of the new time window, a time after the preset period starting from the start time of the new time window, so as to generate a rolling time window.

3. The method for detecting security event as claimed in claim 2, wherein matching the log data with the security event model in each time window comprises:
    acquiring a generation time of the log data;
    judging whether the generation time of the log data is within a time range of the time window;
    in response to that the generation time of the log data is within the time range of the time window, matching the log data with the security event model;
    in response to that the generation time of the log data is less than the start time of the time window, deleting the log data;
    in response to that the generation time of the log data is greater than the end time of the time window, storing data of the matching result set, setting the end time of the time window to be the start time of the new time window, and setting, to be the end time of the new time window, a time after the preset period starting from the start time of the new time window; and
    returning to a step of acquiring the generation time of the log data, so as to match the log data with the security event model in the new time window.

4. The method for detecting security event as claimed in claim 1, wherein the matching result set comprises a unique identifier of the log data and a unique identifier indicating that the rule model has been successfully matched.

5. The method for detecting security event as claimed in claim 1, wherein matching the log data with the security event model in each time window comprises:
acquiring a security event detection tree and a relational expression of the security event model, wherein the security event detection tree comprising a root node, leaf nodes and non-leaf nodes; and
matching the log data according to the security event detection tree and the relational expression, wherein the root node represents a state result for indicating whether the security event model is successfully matched; the leaf nodes store information of the rule models; the non-leaf nodes represent state results corresponding to whether the leaf nodes are successfully matched; and the relational expression represents a relationship between the rule models.

6. The method for detecting security event as claimed in claim 5, wherein matching the log data according to the security event detection tree comprises:
acquiring a state result of the root node;
according to the state result of the root node, judging whether the security event model is successfully matched;
in response to that it is judged according to the state result of the root node that the security event model is not successfully matched, acquiring the non-leaf node that is not successfully matched under the root node;
generating the state result of the root node according to a state result of the non-leaf node and the relational expression;
according to the state result of the root node, judging whether the security event model is successfully matched;
in response to that the security event model is not successfully matched, acquiring the leaf node corresponding to the non-leaf node;
generating the state result of the non-leaf node according to the leaf node and the relational expression;
returning to a step of acquiring the non-leaf node that is not successfully matched under the root node; and
in response to that the security event model is successfully matched, updating the state result of the root node, and updating the matching result set.

7. The method for detecting security event as claimed in claim 1, wherein the function of the time window is to perform window calculation in a matching process; and the window calculation is a data processing mode in real-time calculation, segments a data stream into different windows according to a fixed time or length, and performs a corresponding aggregation operation on data, so as to obtain a statistical result within a time range.

8. The method for detecting security event as claimed in claim 1, wherein the rolling window is to allocate each element to a window of a size; and the rolling window has a fixed size and does not overlap.

9. The method for detecting security event as claimed in claim 1, wherein after matching the log data with the security event model in each time window, the method further comprises:
establishing an association relationship between the log data and the security event model, and recording the association relationship in the matching result set.

10. The method for detecting security event as claimed in claim 1, wherein each security event model corresponds to one matching result set.

11. The method for detecting security event as claimed in claim 1, wherein a rule model is a model capable of directly identifying whether the log data or traffic data includes an attack behavior.

12. The method for detecting security event as claimed in claim 1, wherein a number of nested layers of the rule models is used for describing a hierarchy of the security event model, and a dimension of the security event model is described with a number of times of operation of an outermost logical expression.

13. The method for detecting security event as claimed in claim 1, further comprising:
determining that when a data stream is discontinuous, and therefore it is impossible to use a time of the log data to accurately judge whether a current window has ended, judging that a timer needs to perform a window switching operation, in response to judging that the window switching operation needs to be performed, the timer checks whether there is an unsaved matching result in the matching result set; and in response to determining that there is an unsaved matching result in the matching result set, storing data in the matching result set, and then performing the window switching operation.

14. An apparatus for detecting security event, comprising:
a memory, configured to store a computer program; and
a processor, configured to perform the computer program to: acquire a time window, and acquire log data, wherein the time window is a rolling window in a preset period; match the log data with a security event model in each time window, so as to generate a matching result set in each time window, wherein the security event model is a model comprising a plurality of rule models for identifying whether the log data has an attack behavior; and generate security event data according to the matching result set, so as to restore an attack process according to the security event data, wherein restoring the attack process is used to realize detection of the security event, in order to give an alarm for the security event; the processor is further configured to: collect the log data; and perform normalization processing on a name of a data field of the log data by means of Extract Transform Load (ETL) technology, standardize a data value, supplement a feature field, and add a unique identifier of the log data, so as to generate standardized log data.

15. The apparatus for detecting security event as claimed in claim 14, the processor is configured to perform the computer program to: set a current system time to be a start time of the time window when a system is started, and set, to be an end time of the time window, a time after the preset period starting from the start time; according to a preset frequency, detect whether a current time is greater than the end time of the time window; and in response to that the current time is greater than the end time of the time window, set the current time to be the start time of a new time window, and set, to be the end time of the new time window, a time after the preset period starting from the start time of the new time window, so as to generate a rolling time window.

16. The apparatus for detecting security event as claimed in claim 15, the processor is configured to perform the computer program to: acquire a generation time of the log data; judge whether the generation time of the log data is within a time range of the time window; in response to that the generation time of the log data is within the time range of the time window, match the log data with the security event model; in response to that the generation time of the log data is less than the start time of the time window, delete the log data; in response to that the generation time of the log data is greater than the end time of the time window, store data of the matching result set, set the end time of the time window to be the start time of the new time window, and set, to be the end time of the new time window, a time after the preset period starting from the start time of the new time window; and return to a step of acquiring the generation time of the log data, so as to match the log data with the security event model in the new time window.

17. The apparatus for detecting security event as claimed in claim 14, wherein the matching result set comprises a unique identifier of the log data and a unique identifier indicating that the rule model has been successfully matched.

18. The apparatus for detecting security event as claimed in claim 14, wherein the processor is configured to perform the computer program to: acquire a security event detection tree and a relational expression of the security event model, wherein the security event detection tree comprising a root node, leaf nodes and non-leaf nodes; and match the log data according to the security event detection tree and the relational expression, wherein the root node represents a state result for indicating whether the security event model is successfully matched; the leaf nodes store information of the rule models; the non-leaf nodes represent state results corresponding to whether the leaf nodes are successfully matched; and the relational expression represents a relationship between the rule models.

19. A non-transitory computer-readable storage medium, wherein a computer program is stored on the non-transitory computer-readable storage medium, and the computer program performed by a processor, cause the processor to: acquire a time window, and acquire log data, wherein the time window is a rolling window in a preset period; match the log data with a security event model in each time window, so as to generate a matching result set in each time window, wherein the security event model is a model comprising a plurality of rule models for identifying whether the log data has an attack behavior; and generate security event data according to the matching result set, so as to restore an attack process according to the security event data, wherein restoring the attack process is used to realize detection of the security event, in order to give an alarm for the security event; the processor is further configured to: collect the log data; and perform normalization processing on a name of a data field of the log data by means of Extract Transform Load (ETL) technology, standardize a data value, supplement a feature field, and add a unique identifier of the log data, so as to generate standardized log data.

* * * * *